United States Patent

[11] 3,555,362

| [72] | Inventor | Frederic R. Quinn |
| | | Red Hook, N.Y. |
| [21] | Appl. No. | 768,489 |
| [22] | Filed | Oct. 17, 1968 |
| [45] | Patented | Jan. 12, 1971 |
| [73] | Assignee | Zyrotron Industries, Inc. |
| | | South Hackensack, N.J. |
| | | a corporation of New York |

[54] PHASE PROTECTION SYSTEM FOR PROTECTING A THREE-PHASE LOAD
9 Claims, 1 Drawing Fig.

[52] U.S. Cl.................................................. 317/46,
317/13, 317/17, 317/41, 307/117, 317/31
[51] Int. Cl...................................................... H02h 3/24,
H02h 3/08
[50] Field of Search.......................................... 317/46, 13,
41, 13.2, 31, 18, 13.3, 17; 307/117, 125

[56] References Cited
UNITED STATES PATENTS

| 3,225,280 | 12/1965 | Happe et al.................. | 317/13 |
| 3,243,658 | 3/1966 | Blackburn.................... | 317/31 |
| 3,404,313 | 10/1968 | Happel et al................. | 317/41 |
| 3,428,865 | 2/1969 | Opad............................ | 317/46 |

Primary Examiner—J. D. Miller
Assistant Examiner—Harvey Fendelman
Attorney—Irving Seidman ABSTRACT: Apparatus for connecting a three-phase source of energy to a load only when a signal is present in each phase comprising a connector having a control relay for connecting the source with the load in respond to current flow through the relay. Switch means is provided which is responsive to the failure of a signal in any one phase for disconnecting the control relay from a source of current.

The apparatus further includes overload protection means and a device for preventing reverse DC current flow through the ground lead in a four-wire system.

PATENTED JAN 12 1971
3,555,362
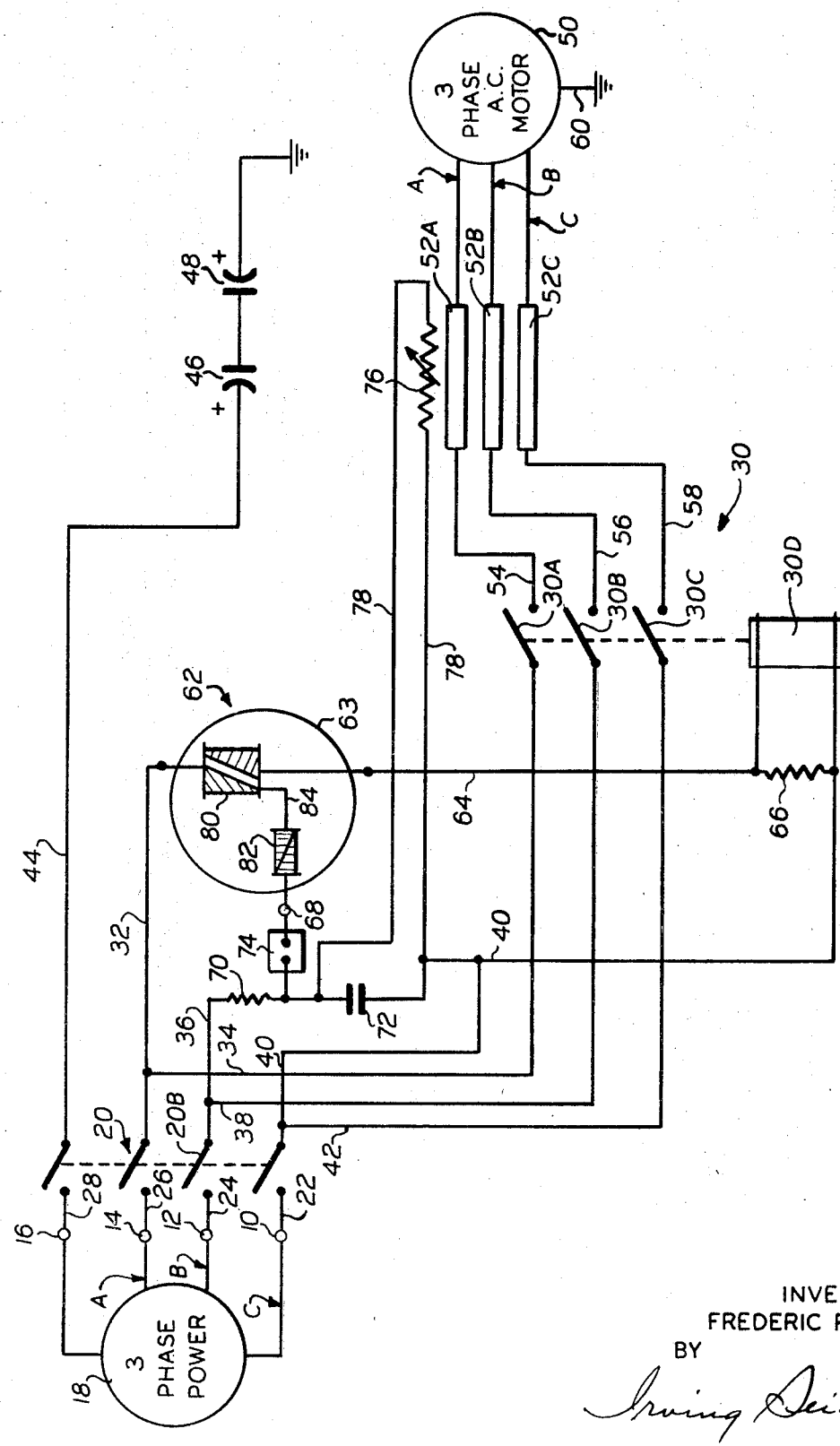
INVENTOR
FREDERIC R. QUINN
BY
*Irving Seidman*
ATTORNEY.

3,555,362

PHASE PROTECTION SYSTEM FOR PROTECTING A THREE-PHASE LOAD

This invention relates generally to phase protection apparatus for a three-phase system and, more particularly, pertains to apparatus which is adapted to disconnect a load from a three-phase supply if one of the phases fail.

In present three-phase systems employing motors, for example, the failure of a phase will not necessarily cause the motor to stop but the motor will continue to operate as a single-phase device. This is particularly true if the motor is not fully loaded so that any overload current will be insufficient to operate the overload protection devices. As a result, serious overheating and consequent permanent damage to the motor may result.

Accordingly, an object of the invention is to provide apparatus which is responsive to the failure of a single phase in a three-phase system for disconnecting the load from the three-phase source.

Another object of the invention is the provision of an apparatus which includes overload protection to disconnect a load from a three-phase supply in the event of excessive current flow.

A further object and feature of the present invention resides in the novel details of circuitry which provide semiconductor apparatus of the type described which may utilize a control current measured in microanyseres to control heavy duty loads.

Another object of the invention is to provide an apparatus as described above, which is relatively simple in construction and highly reliable in operation.

Accordingly, apparatus constructed in accordance with the present invention includes at least three input terminals adapted to be connected to each phase of a three-phase source of energy. Correct means having a control device is provided which is operable to connect the load with the input terminals in response to current flow through the control device. Disabling means responsive to the failure of a signal in any one of the phases is provided for disabling the connect means so that the load is disconnected from the input terminals.

Other features and advantages of the present invention will become more apparent from a consideration of the following detailed description when taken in conjunction with the accompanying drawing, in which the single FIG. is a schematic circuit wiring diagram of apparatus constructed according to the present invention.

As shown in the FIG., the apparatus of the present invention includes four input terminals 10, 12, 14 and 16 which are adopted to be connected to the respective mains of a three-phase four-wire source of energy 18. The terminals 10—16 are connected to the respective contacts of one side of a four-pole single-throw switch 20 by individual leads 22, 24, 26 and 28. The respective letters A, B and C designate the respective phases of the system.

Armature 20A of the switch 20 (which is associated with phase A) is connected to switch 30A of contactor 30 by leads 32 and 34. Armature 20B (which is associated with phase B) is connected to switch 30B of contactor 30 by the leads 36 and 38. Similarly, armature 20C (which is associated with phase C) is connected to switch 30C of the contactor 30 by the leads 40 and 42. Armature 20D is associated with the neutral or ground return of the system and is connected to ground by a lead 44 through serially connected electrolytic capacitors 46 and 48, as described in detail below.

The contactor 30 is conventional in construction and includes a relay winding 30D which is adapted to close the normally open switches 30A—30C when current flows through the winding 30D thereby to connect the load or motor 50 with the input terminals 10—14 through the switch 20.

To be more specific, the other side of switch 30A is connected to the A phase terminal of the motor 50 by a lead 54 through a heater 52A. Similarly, the other side of the switch 30B is connected to the B phase terminal of the motor 50 by a lead 56 through a heater 52B. In a like manner, the other side of the switch 30C is connected to the motor 50 by a lead 58 through a heater 52C. A lead 60 connects the neutral wire of the motor 50 to ground. Thus, when the switch 20 is closed and the relay winding 30D is energized, the switches 30A—30C close to connect the motor terminals to the source 18 through the heaters 52A—52C, the connecting leads and the input terminals 10—16.

The relay winding 30D is connected between phases A and C through the circuit comprising the lead 32, a disabling means designated generally by the reference numeral 62, a lead 64, the relay winding 30D, and the lead 40. A resistor 66 is connected in shunt with the relay winding 30D to provide a path for leakage current for the disconnect means 62, as noted below. The disconnect means 62 is operable to open the current path between the phases A and C to deenergize the relay winding 30D if the signal on any one of the phases A, B or C fails or otherwise disappears. Accordingly, the switches 30A—30C will open to disconnect the load 50 from the energized terminals 10—14 to prevent operation of the load as a single phase motor and thereby eliminate the possibility of damage to the equipment.

In practice, the disabling means 62 includes a Quadrac 63 having one anode terminal connected to the lead 32, the other anode terminal connected to the lead 64 and a control terminal 68 connected to the junction of a resistor 70 and a capacitor 72 through a thermostat 74. The resistor 70 and the capacitor 72 are connected between leads 36 and 40 and, therefore, are connected between phases B and C. A negative temperature coefficient resistor 76 is connected in shunt with the capacitor 72 by a lead 78 and is positioned to be heated by any one of the heaters 52A—52C to provide an overload protection in the manner described below.

The Quadrac 63 comprises a Triac portion 80 and a Diac portion 82 connected between the gate electrodes of the Triac portion 80 and the control terminal 68. The Triac, which is commercially available, comprises a pair of silicon controlled rectifiers connected in inverse parallel relationship and having their gate electrodes connected together and to the lead 84. To be more specific, the cathode terminal of one of the silicon controlled rectifiers is connected to the anode electrode of the other and the anode electrode of the one silicon controlled rectifier is connected to the cathode electrode of the other. The Diac, which similarly is commercially available and which is referred to alternatively as a Silicon Bidirectional switch or a Semiconductor Bidirectional switch comprises a pair of zener diodes serially connected together in back-to-back relationship (i.e., the anode electrode of one diode is connected to the anode electrode of the other diode). The Quadrac 63 is offered for sale as a unit by the Electronic Control Corporation of Dallas, Texas and if more information on this device is desired the reader is referred to the aforementioned Corporation.

From the above description of the Quadrac 63 it will be obvious that the Quadrac will provide a current path from the lead 32 to the lead 64 (from phase A to phase C) if alternating signals are present at each anode terminal of the Quadrac and at the control terminal 68. However, if any one of the phases A, B or C fails so that the signal on that phase no longer is present the Quadrac 63 will cease to conduct. Since the relay winding 30D is connected in series with the anode-to-anode path of the Quadrac, it will be obvious that the Quadrac will control the operation of the contactor 30.

In operation, it will be assumed that the motor 50 is associated with a furnace blower or the like which is adapted to be energized when the ambient temperature reaches a preselected value. Accordingly, the switch 20 is closed and the thermostat 74 is set for the desired temperature. When the ambient temperature falls below the preselected value the thermostat switch 74 closes. Since lead 36 is connected to lead 40 (phase B to phase C) through the resistor 70 and capacitor 72, the signal at the junction thereof is applied to the control terminal 68. Hence, the Quadrac 63 begins to conduct from anode terminal to anode terminal thereby permitting current to flow through the relay winding 30D. (Since the winding 30D is inductive, the resistor 66 provides a leakage current path for conduction of the Quadrac.) Thus, the switches 30A—30C close to connect the load with the source 18 to energize the motor 50.

It should be noted that the above-described circuit permits a heavy duty load, such as a 100 HP motor, to be controlled by a microampere current. To be more specific, the current supplied to the control terminal 68 of the Quadrac 63 is measured in microamperes. Thus, this relatively small current controls the operation of the contactor 30 and, hence, the motor 50.

As noted above, if any one or more of the phases A, B or C fail so that the signal on that phase is reduced to a negligible value, the Quadrac 63 ceases to conduct so that current stops flowing through the relay winding 30D. Thus, the switches 30A—30C open to disconnect the motor 50 from the source 18 to deenergize the same.

Accordingly, a simple semiconductor apparatus has been provided which is operable to disconnect a load from a three-phase source of energy in the event of failure of one or more phases to prevent damage to the load equipment.

As noted above, the present apparatus also provides overload protection in the event that one or more phases draw an excessive current. For example, if it is assumed that a short circuit exists in a phase A winding in the motor 50, an excessive current flows through the heater 52A. The ambient temperature of the negative temperature coefficient resistor 76 increases so that its resistance decreases. Since the resistor 76 shunts the capacitor 72, the decreased resistance shunts current away from the control terminal 68 of the Quadrac 63. The continued decrease in resistance of resistor 76 finally will draw sufficient current away from the control terminal 68 to cause the Quadrac to stop conducting.

As a result of the above the relay winding 30D again is deenergized so that the load 50 is disconnected from the source 18. The short circuited element then may be repaired.

In many applications a relatively high DC potential is used in conjunction with an AC potential. For example, welding devices use a grounded DC return lead in a portion of the circuit, whereas riveting devices use a grounded AC return load. Both devices may be used simultaneously on the same workpiece. As a result, it has been found that the DC potential feeds back through the ground wire in a three-phase four-wire system thereby placing a high DC potential on the riveting gun. As a result, the guns have been severely damaged and, more important, the operators have suffered severe electrical shocks.

The capacitors 46 and 48 of the present apparatus eliminate the above possibilities by preventing DC current from flowing through the grounded lead 44. As noted above, the capacitors 46 and 48 are electrolytic capacitors. The positive terminal of the capacitor 48 is connected to ground and the positive terminal of the capacitor 46 is connected to the terminal 16 through the switch 20. Accordingly, the capacitor 46 prevents a positive DC current from flowing through the AC ground lead and the capacitor 48 prevents a negative DC current from flowing the ground lead. However, AC current is permitted to flow. Hence, the present apparatus further prevents damage to personnel and property due to DC current flowing through the AC ground leads.

While a preferred embodiment of the invention has been shown and described herein, it will be obvious that many additions, changes and omissions may be made in such embodiment without departing from the spirit and scope of the present invention. For example, the thermostat 74 may be replaced by a conventional switch located at a remote point so that the load may be remotely controlled. Alternatively, the control terminal may be connected directly to the junction of the resistor 70 and the capacitor 72. Additionally, other loads than a motor may be used with the subject apparatus.

I claim:

1. Apparatus for disconnecting a three-phase source of energy from a load in response to the failure of any one phase comprising at least three input terminals adapted to be connected respectively to each phase of said three-phase source of energy, connect means having a control device for connecting the load with said input terminals in response to current flow through said control device, and disabling means responsive to the failure of a signal in any one of said phases for disabling said connect means, whereby said connect means disconnects the three-phase source from the load, said disabling means having one main terminal connected to one of said input terminals, another main terminal connected to another of said input terminals, and a control terminal connected to the third input terminal, whereby each phase of the source of energy is individually connected to a different one of said disabling means terminals, said disabling means being operable between a conducting state whereby current flows through said control device, and a nonconducting state to prevent current flow through said control device, said disabling means being rendered nonconducting by the failure of the signal in at least one of said phases.

2. Apparatus for disconnecting the three-phase source of energy from a load in response to the failure of any one phase comprising at least three input terminals adapted to be connected respectively to each phase of said three-phase source of energy, connect means having a control device for connecting the load with said input terminals in response to current flow through said control device, and disabling means connected to said input terminals and responsive to the failure of a signal in any one of said phases for disabling said connect means, whereby said connect means disconnects the three-phase source from the load, lead means for connecting said control device and said disabling means in a series path between at least two of said input terminals, said disabling means being operable between a conducting state whereby current flows through said control device, and a nonconducting state to prevent flow through said control device, said disabling means being rendered nonconducting by the failure of a signal in at least one of said phases, said disabling means comprising a Quadrac having first and second anode terminals connected in a series loop with said control device between said two input terminals, and a control terminal connected to said third terminal.

3. Apparatus as in claim 2, and switch means for selectively connecting said control terminal to said third input terminal.

4. Apparatus as in claim 2, in which said Quadrac includes a pair of silicon controlled rectifiers connected in inverse parallel relationships and having their gate electrodes connected together, said lead means connecting the anode-cathode paths of said silicon controlled rectifiers in said series path and a pair of zener diodes serially connected together in back-to-back relationships with each other and between said control electrodes and the third terminal.

5. Apparatus as in claim 2 and overload protection means connected to said control terminal, said overload protection means including means responsive to currents above a preselected value for rendering said Quadrac nonconducting.

6. Apparatus as in claim 4, and first protection second impedances connected between said third terminal and one of said other terminals, said pair of serially connected zener diodes having one end connected to the junction of said first and second impedances, a negative temperature coefficient device connected in shunt with one of said impedances, and heater means connected between at least one of said terminals and the load for increasing the temperature of said negative temperature coefficient device in response to excessive current flow, whereby current is shunted from said gate electrodes to render said silicon controlled rectifiers nonconductive.

7. Apparatus as in claim 2, and a fourth input terminal adapted to be connected to the neutral main of a three-phase four-wire system, a lead for connecting said fourth terminal to ground, and protection means in said lead blocking DC current flow through said lead.

8. Apparatus as in claim 7 in which said protection means includes a pair of serially connected electrolytic capacitors having terminals of the same polarization connected together.

9. Apparatus as in claim 1, and overload means connected to each one of said input terminals and responsive to current flow above a preselected value in any one of said phases for rendering said disabling means nonconducting.